June 22, 1965   G. KIPER ETAL   3,190,203
MANUALLY AND AUTOMATICALLY OPERABLE CAMERA
Filed Feb. 13, 1961   2 Sheets-Sheet 1

INVENTORS
GERD KIPER
WILLY KADEN
BY
Michael S. Striker
Atty 3,190,203
MANUALLY AND AUTOMATICALLY
OPERABLE CAMERA
Gerd Kiper, Unterhaching, near Munich, and Willy Kaden, Munich, Germany, assignors to Agfa Aktiengesellschaft, Leverkusen-Bayerwerk, Germany
Filed Feb. 13, 1961, Ser. No. 88,822
Claims priority, application Germany, Feb. 19, 1960, A 34,009
10 Claims. (Cl. 95—64)

The present invention relates to cameras.

More particularly, the present invention relates to that type of camera which can be either atuomatically or manually operated. Cameras of this type have several disadvantages. Thus, the automatic operation usually involves moving one of the exposure-determining elements, such as the exposure aperture or the exposure time determining element, through its entire range of movement before the other of the exposure determining elements is actuated. For example, the automatic mechanism may move the diaphragm adjusting element through its entire range of movement before it starts to move the exposure time determining element. As a result the constructor has no possibility to select the most favorable combination of exposure time and exposure aperture for each lighting condition. Moreover, in order to manually operate the camera it is necessary to actuate certain elements which will block the operation of the automatic structure, and this of course gives rise to disadvantages since the operator does not always remember to set the camera so as to block the automatic operation thereof when it is desired to manually set the camera. In addition, with conventional cameras of the above type it is not only difficult to set manually a desired combination of exposure time and exposure aperture but it is also impossible to set the exposure time determining element for a bulb exposure.

It is accordingly a primary object of the present invention to provide a camera which on the one hand is capable of being manually set and on the other hand is capable of being automatically set and which at the same time is not compelled to give only one set of combinations of exposure time and exposure aperture when the camera is automatically set.

Another object of the present invention is to provide a camera of the above type which, without requiring the operator to manipulate any lock buttons or the like, will nevertheless automatically prevent operation of the structure for automatically setting the camera when the camera is manually operated.

A further object of the present invention is to provide a camera of the above type wherein the operator can allow the automatic setting structure to return as many times as is wished to its starting position without making an exposure even though the automatic structure has been initially released for operation, so that it is not necessary to make an exposure with the camera of the invention once the automatic setting structure has been released for operation.

An additional object of the present invention is to provide for a camera of the above type an exceedingly simple, compact, and reliable structure which will accomplish all of the above objects.

With the above objects in view, the invention includes, in a camera, a rotary diaphragm ring means which is turnable about the optical axis for setting the diaphragm. An automatic means cooperates with the diaphragm ring means for turning the latter according to the lighting conditions, and in accordance with the present invention an exposure time control means is operatively connected to the diaphragm ring means for turning movement therewith so that when the automatic means turns the diaphragm ring means not only will the diaphragm be set but also the exposure time will be set.

Also with the above objects in view, the invention provides, in a camera, a manually operable means and an automatic means for setting both the exposure time and the exposure aperture of the camera. In accordance with the present invention the manually operable means carries a stop means which cooperates with the automatic means for preventing operation of the latter except when the manually operable means locates the exposure time and the diaphragm at predetermined settings, so that unless the exposure time and the diaphragm are at the latter settings it is not possible to automatically set the camera.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 2:
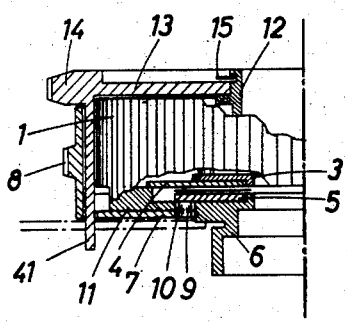
FIG. 2 is a sectional view of the structure of FIG. 1 taken along line II—II in the direction of the arrows.
Figure 3:
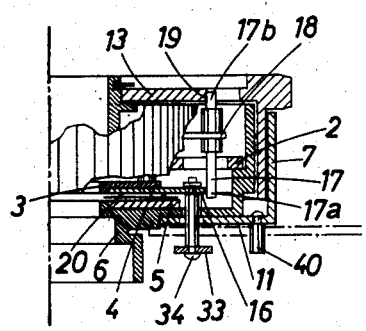
FIG. 3 is a sectional view of the structure of FIG. 1 taken along the line III—III of the FIG. 1 in the direction of the arrow.

Referring to FIGS. 2 and 3, there is shown therein the housing 1 of a between-the-lens shutter. Within the housing 1 is located a stationary mounting plate 2 which supports various elements within the housing 1 in a well known manner. Also, the housing 1 carries a stationary ring 3 which extends around the optical axis and which is circular and has its center located in the optical axis. This stationary ring 3 has at its inner periphery a flange extending for a slight distance rearwardly along the optical axis, and thus this ring 3 acts as a bearing to support a ring 4 for rotary movement about the optical axis. The ring 4 forms one of a pair of rotary diaphragm ring means either of which is turnable about the optical axis for setting the diaphragm of the camera. The other of the turnable diaphragm ring means is formed by the ring 5 which is coaxial with and located to the rear of the ring 4. The housing 1 fixedly carries at its rear end a wall 11 which is integral with or fixed to a rearwardly directed tubular extension 6 adapted to be connected in a known way with the front wall of the camera for mounting thereon the objective assembly shown in the drawings, and this tubular extension 6 is provided at its front end with a forwardly directed flange so that at its front end tubular extension 6 serves as a bearing for the diaphragm ring means 5. The stationary tubular extension 6 also serves as a bearing which turnably carries the manually turnable cup-shaped member 7 which forms a manually operable means for setting the diaphragm of the camera. At its exterior the manually operable diaphragm setting means 7 is provided with a knurled raised portion 8 adapted to be engaged by the operator for facilitating turning of the means 7 so as to set the diaphragm. A pin 9 is connected on the one hand to the rear wall of the turnable cup-shaped member 7 and on the other hand to the ring 5 so that the latter is constrained to turn with the manually operable means 7, and in this way manually setting the diaphragm is effected. The wall 11 is formed with an arcuate slot 10 extending along an arc of a circle whose center is in the optical axis through an angular distance sufficiently great to provide for free movement of the pin 9 throughout the entire range of adjustment of the diaphragm, so that there is no interference with setting of the diaphragm by the manually operable means 7.

The shutter housing 1 additionally carries at its front end a tubular extension 12 whose axis coincides with the optical axis, and this tubular extension 12 serves as a support for the rotary ring 13 which forms a manually operable means for setting the exposure time. The ring 13 is provided at a portion of its exterior periphery with a knurled raised portion 14 to facilitate manual turning of the ring 13. The housing 1 prevents rearward movement of the ring 13 along the optical axis, and the tubular extension 12 carries a snap ring 15 in a groove of the extension 12, as shown in FIGS. 2 and 3, and this snap ring 15 is located ahead of the ring 13 to prevent axial displacement thereof forwardly along the optical axis, and in this way the ring 13 is prevented from axial movement and thus can only turn angularly about the optical axis.

The diaphragm ring means 4 is provided at a portion of its outer peripheral edge with an exposure time controlling cam portion 16. In other words the portion 16 of the outer periphery of the ring 4 has the configuration of a cam which controls the exposure time, and the configuration of an exposure time controlling cam is well known in the art. In this way an exposure time control means is connected with the diaphragm ring means 4 for rotary movement therewith. The camming edge portion 16 of the ring 4 engages the end portion 17a of a cam follower pin 17 which is fixed with a lever 18 which forms part of a well known mechanism for setting the exposure time. Thus, as the ring 4 turns about the optical axis, the camming portion 16 thereof will cooperate with the end portion 17a of the pin 17 to regulate the distance of the pin 17 from the optical axis and to thus regulate the position of the lever 18 which in turn regulates the exposure time in a well known manner. An unillustrated spring is connected to the lever 18 for urging the latter to turn in that direction which maintains the end portion 17a of the cam follower pin 17 in engagement with the exposure time control means 16. The cam follower pin 17 has distant from its end 17a an end portion 17b which engages an exposure-time determining camming edge 19 forming part of the edge of a cutout which passes through the ring 13, and it will be noted that the camming edge 19 is on the same side of the pin 17 as the camming edge 16 so that the spring which acts on the lever 18 to maintain the end portion 17a of the pin 17 in engagement with the camming edge 16 will also maintain the end portion 17b of the pin 17 in engagement with the camming edge 19. Thus, with this construction the exposure time may be set either simultaneously with the setting of diaphragm by turning of the ring 4, or the exposure time may be manually set by manual turning of the ring 13.

The blades 20 of the diaphragm are situated between the pair of diaphragm setting rings 4 and 5. These blades 20 are connected with the rings 4 and 5 in a well known manner. For example, one of the rings 4 and 5 is formed with bores and the other of the rings 4 and 5 is formed with camming slots. Pins which are carried by the blades 20 extend in a well known manner into the bores of the one ring 4 or 5 so that the blades 20 are in this way pivotally connected to this one ring while additional pins which are respectively fixed to the diaphragm blades extend into the camming slots of the other of the pair of rings 4 and 5, these camming slots serving to control the turning of the blades so as to open and close the diaphragm in a well known manner. For example, each diaphragm blade may be pivotally connected to the ring 4 and may have a pin which extends into a camming slot formed in the ring 5. With this construction when the ring 5 is stationary and the ring 4 turns the diaphragm will be opened or closed depending upon the direction of turning of the ring 4, while when the ring 4 is stationary and the ring 5 turns the diaphragm will also be open or closed depending upon the direction of rotation of the ring 5.

Figure 1:
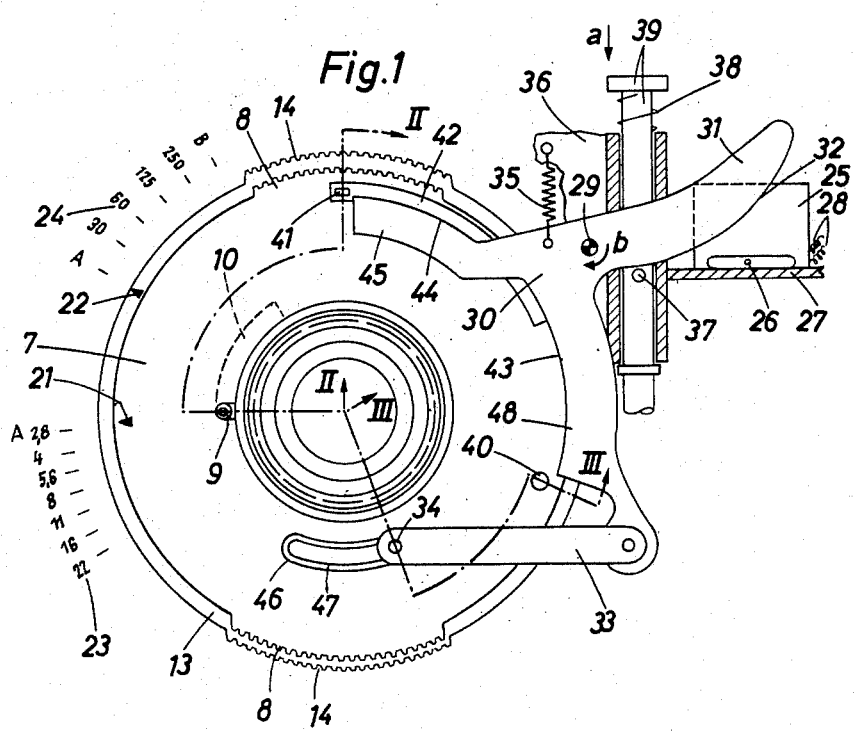
FIG. 1 is a partly diagrammatic illustration of one possible embodiment of a structure according to the present invention, this structure being shown in FIG. 1 as it appears from the rear while looking along the optical axis.

The manually operable members 7 and 13 are provided, as shown diagrammatically in FIG. 1, with indexes 21 and 22 which respectively cooperate with the scales 23 and 24 diagrammatically indicated in FIG. 1 so that by aligning these indexes with selected graduations of these scales it is possible for the operator to manually set the camera to a desired combination of exposure aperture and exposure time. It will be noted that at one end of each of the scales 23 and 24 is located a graduation identified by the symbol A, and this graduation indicates the setting of the particular member 7 or 13 for allowing the camera to be automatically set in accordance with the lighting conditions.

The camera is provided with an instrument such as a galvanometer 25 whose rotor is connected to a pointer 26 which turns in a horizontal plane, as viewed in FIG. 1, to assume an angular position in accordance with the lighting conditions. The galvanometer 25 is carried by a stationary support plate 27 and is connected by the conductors 28 to an instrument such as a photoelectric cell or to a circuit which includes a battery and a light-sensitive electrical resistor, so that in this way the galvanometer will be actuated in accordance with the lighting conditions to locate the pointer 26 at an angular position which is indicative of the lighting conditions, as is well known in the art.

A stationary part of the camera fixedly carries a stationary pivot pin 29 which extends parallel to the optical axis, and this pivot pin 29 supports for turning movement a lever 30 which together with a link 33 described below forms an automatic means for automatically setting the camera. The lever 30 has an arm 31 which forms a scanning member in that the lower edge 32 of the arm 31, as viewed in FIG. 1, will engage the pointer 26 so that the latter will determine the extent to which the lever 30 turns in order to automatically set the camera in accordance with the lighting conditions. A second arm 48 of the lever 30 is pivotally connected at its lower end, as viewed in FIG. 1, to a link 33 which at its end distant from the arm 48 is pivotally connected to a pin 34 which is fixed to the rotary diaphragm ring means 4. The rear wall of the manually operable means 7 and the rear wall 11 of the housing 1 are respectively formed with the arcuate slots 46 and 47 shown in FIG. 1 through which the pin 34 extends in a direction parallel to the optical axis, these slots extending along circles whose centers are in the optical axis, so that in this way the pin 34 as well as the manually operable means 7 can turn throughout their range of turning movement without interfering with each other. Instead of being fixed to the ring 4, the pin 34 may be connected to the ring 4 in such a way that the pin 34 can turn the ring 4 about the optical axis while the pin 34 also moves about the optical axis but at the same time the pin 34 is free to turn about its own axis. Thus, the lever 30 together with the link 33 and of course the pin 34 form an automatic means which will automatically set the camera in that in accordance with the position of the pointer 26 the lever 30 will assume an angular position which is indicative of the lighting conditions and will thus cause the link 33 and the pin 34 to turn the diaphragm ring means 4 to an angular position which is also indicative of the lighting conditions, and not only will the turning of the ring 4 result in setting of the diaphragm, but in addition the camming edge portion 16 of the ring 4 will result in setting of the exposure time, and it will be noted that in this way the operation is not one where the diaphragm setting structure moves through its entire range before the exposure time setting structure is actuated or vice versa.

A spring 35 (FIG. 1) is connected at one end to the lever 30 and at its opposite end to a stationary pin carried by the stationary wall 36 of the camera, so that this spring 35 which is under tension urges the lever 30 in the direction of the arrow b as shown in FIG. 1. Thus, it is the spring 35 which turns the lever 30 so as to place the scanning edge 32 of the arm 31 in engagement with the pointer 26. A manually operable release means is provided for releasing the automatic means for movement in the direction of the arrow *b* from its rest position as shown in FIG. 1, and this manually operable means includes the axially movable plunger 39 adapted to be moved by the operator in the direction of the arrow *a* of FIG. 1 in opposition to the spring 38 which is stronger than spring 35. The plunger 39 is guided for movement by a tube which is carried by the wall 36, and the spring 38 bears at one end against a shoulder of the tube and at its upper end against the underside of the enlarged head of the plunger 39 so as to urge the latter upwardly to the position indicated in FIG. 1, the plunger carrying a collar which engages the bottom end of the tube through which the plunger 39 extends so as to limit the upward movement thereof to the position shown in FIG. 1. The plunger 39 carries a pin 37 extending radially from the plunger in a direction parallel to the optical axis, the tube which guides the plunger being formed with a slot through which the pin 37 passes, and this pin 37 is located beneath the arm 31 so that when the operator does not engage the plunger 39 the spring 38 locates the parts in the position indicated in FIG. 1 in opposition to the spring 35. It will be noted that in the rest position of the lever 30 which is shown in FIG. 1 the arm 48 thereof extends along an arc of a circle whose center is in the optical axis, and the lever 30 includes a third arm 45 which also extends along an arc of a circle whose center is in the optical axis. When the manually operable release means 38, 39 is actuated by the operator to release the automatic means for operation, the spring 35 will turn the lever 30 in the direction of the arrow *b*, so that the edge 43 of the lever 30 will approach the optical axis while the arm 45 of the lever 30 will move away from the optical axis.

The pair of manually operable means which are actuated by the operator to manually set the camera respectively carry a pair of stop members for preventing operation of the automatic means unless the pair of manually operable means are in predetermined positions, these positions being provided by aligning the indexes 21 and 22 with the symbols A, as pointed out above. Thus, the manually operable means 7 fixedly carries at its rear wall a pin 40 which forms one of the stop members, and it will be noted that as soon as the manually operable means 7 is turned so as to locate the diaphragm setting ring 5 in a position other than that provided when the index 21 is aligned with the symbol A shown in the scale 23 in FIG. 1, the pin 40 will be located alongside of the edge 43 of the arm 48, and thus turning of the arm 48 toward the optical axis will be prevented. Therefore, if the operator should inadvertently actuate the manually operable release means 38, 39 while the manually operable means 7 is in a position other than that one predetermined position where the pin 40 is located beyond the edge 43, nothing will happen since the lever 30 will be prevented from turning and thus automatic operation will not be possible.

In a similar manner, the manually operable means 13 for setting the exposure time fixedly carries an elongated stop member 41 which extends parallel to the optical axis through an arcuate slot 42 formed in the rear wall of the manually operable means 7, and the slot 42 is long enough so as to provide unobstructed turning of the members 7 and 13 through their range of turning movement without interfering with each other. The stop member 41 will turn along the edge 44 of the arm 45 and will be located at the side of the arm 45 which is distant from the optical axis so that whenever the ring 13 is at an angular position other than that shown in FIG. 1 where the index 22 is aligned with the symbol A of the scale 24, the pin 41 will be located alongside the arm 45 to prevent turning of the latter from the optical axis and thus if at this time the manually operable means 38, 39 is actuated by the operator the automatic structure will also be prevented from operating. It will be seen, therefore, that the structure of the invention provides on the one hand a manually operable means for setting the exposure time and the exposure aperture and an automatic means for setting the exposure time and the exposure aperture, and a stop means is connected with the manually operable means and cooperates with the automatic means to prevent operation of the latter unless the manually operable means is in a predetermined position, which is the position shown in FIG. 1.

Thus, in order to provide for an automatic setting of the camera of the invention, with the rings 7 and 13 in the positions indicated in FIG. 1, the operator need only actuate the manually operable release means 38, 39 by moving the plunger 39 downwardly, and now the spring 35 will turn the lever 30 in the direction of the arrow *b* until the scanning edge 32 of the scanning arm 31 engages the pointer 26. This turning of the lever 30 will cause the link 33 to shift to the left, as viewed in FIG. 1, with the result that the diaphragm ring means 4 will turn to set the diaphragm, and at the same time the exposure time control means 16 will act to set the exposure time. After the automatic means has set the exposure time and the exposure aperture, the shutter may be released so as to make the exposure, and a separate shutter release plunger may be provided for this purpose, or the plunger 39 after it has moved downwardly beyond the maximum distance required for operation of the lever 30 under all conditions may itself release the shutter. In either event, it is apparent that with the structure of the invention if the plunger 39 has been depressed and the shutter has not been tripped, the operator, should he decide not to make an exposure, need only release the plunger 39 and the parts will return to the position of FIG. 1. It is not necessary with the structure of the invention to make an exposure before the parts will return to their rest position, and it is therefore possible for the operator to actuate the plunger 39 as many times as desired before an actual exposure is made.

If it is desired to set the camera manually, then the operator need only turn the rings 7 and 13. The operator need not be concerned at all with the automatic structure and does not have to actuate any element so as to render this structure inoperative. The turning of the ring 7 or the ring 13 from their positions indicated in FIG. 1 will result in blocking of the lever 30 by the stop members 40 or 41, respectively, as described above. Manual turning of the ring 7 will result in turning of the diaphragm ring means 5 so as to set the exposure aperture. Inasmuch as the ring 4 is necessarily stationary during manual turning of the ring 7, the diaphragm blades 20 will be turned simply by turning of the ring 5 at this time. In the same way, turning of the ring 13 will result in cooperation between the camming edge 19 and the end portion 17*b* of the pin 17 to actuate the lever 18 to set the exposure time.

It will be noted that with the structure of the invention not only is it impossible for the automatic structure to be actuated when the camera is manually set, but in addition it is not possible to set the automatic structure into operation unless the manually operable means 7 and 13 have first been set to those positions where the indexes 21 and 22 are aligned with the symbols A of the scale 23, 24 so that it is impossible to start the automatic operation unless the exposure time and exposure aperture have first been set to their proper starting positions.

Figure 4:
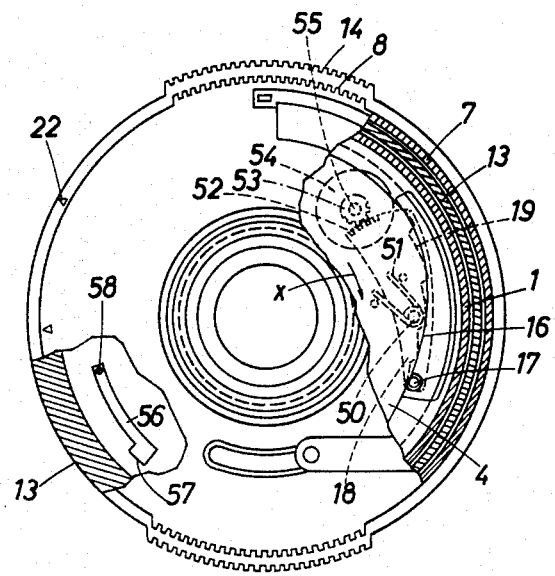
FIG. 4 shows the structure of FIG. 1 with parts shown in FIG. 1 broken away.

The configuration of the exposure-time controlling camming edges 16 and 19 is apparent from FIG. 4, where these camming edges are shown in the position where the indexes 21 and 22 are set for automatic operation. These camming edges are located in parallel planes one behind the other and are substantially coextensive in the position of the parts shown in FIGS. 1 and 4. The camming edge 16 is continuous so as to provide a stepless control of the exposure-time during automatic operation of the camera, while the camming edge 19 is stepped so as to set the exposure time to the values indicated in the scale 24.

The pin 17 is carried by the element 18 in the form of a lever turnable about the stationary pin 50, whose axis is parallel to the optical axis, and the end of lever 18 distant from pin 17 forms a gear sector 52 meshing with a pinion 53 which is fixed coaxially to the rotary mass 54 of the retarding mechanism which holds the shutter blades open to provide the selected exposure time, the rotary mass 54 and the pinion 53 being supported for rotation on a common stationary shaft 55.

The exposure-time controlling ring 13 is formed, in addition to the camming edge 19, with a cutout 56 provided at one end portion with a widened part 57, and a pin 58 is located in this cutout, this pin 58 forming part of a well known control lever of a structure for permitting the operator to manually hold the shutter open so as to make an exposure whose length of time is determined by the operator.

When the camera operates automatically, the diaphragm ring means 4 turns in the direction of the arrow x shown in FIG. 4 and thus causes the control edge 16 to act on the pin 17 so as to turn the lever 18. Thus, in addition to setting the exposure aperture, rotary movement of the ring 4 sets the exposure time.

In order to manually set into the camera a desired exposure time, the ring 13 is manually turned from the position shown in FIG. 4 also in the direction of the arrow x, and thus the control edge 19 will turn and will act on the pin 17 to again turn the lever 18 so as to set the exposure time. The pin 58 will remain in the cutout 56. If the ring 13 is turned to such an extent that the index 22 becomes aligned with the graduation B of scale 24, the operator knows that the camera is set for manual retaining of the shutter in its open position, and at this time the pin 58 is located in the widened end portion 57 of the cutout 56 so that the lever which carries the pin 58 can be manually turned to enable the operator to manually maintain the shutter in its open position, as is well known. Thus, with this setting the shutter will remain open as long as the operator maintains the shutter release plunger depressed. Of course, when this plunger is released the pin 58 will return to the upper edge of the cutout 56, as viewed in FIG. 4, so that when the ring 13 is turned in a counterclockwise direction, as viewed in FIG. 4, the pin 58 will be received in the narrower part of the cutout 56.

It will be understood that each of the elements described above or two or more together, may also find a useful application in other types of cameras differing from the types described above.

While the invention has been illustrated and described as embodied in manual and automatic cameras, it is not intended to be limited to the details shown, since various modifications and structural changes may be made without departing in any way from the spirit of the present invention.

Without further analysis the foergoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a camera, in combination, rotary diaphragm ring means turnable about the optical axis of the camera for setting the diaphragm thereof; automatic means cooperating with said rotary diaphragm ring means for automatically turning the latter to an angular position determined by the lighting conditions; exposure time control means operatively connected to said rotary diaphragm ring means for turning movement therewith, said exposure time control means setting the exposure time during turning of said rotary diaphragm means by said automatic means; second rotary diaphragm ring means coaxial with said first-mentioned ring means and also cooperating with the diaphragm of the camera to set the diaphragm; and manually operable means operatively connected to said second ring means for manually turning the latter to set the diaphragm.

2. In a camera, in combination, rotary diaphragm ring means turnable about the optical axis of the camera for setting the diaphragm thereof; automatic means cooperating with said rotary diaphragm ring means for automatically turning the latter to an angular position determined by the lighting conditions; exposure time control means operatively connected to said rotary diaphragm ring means for turning movement therewith, said exposure time control means setting the exposure time during turning of said rotary diaphragm means by said automatic means; second rotary diaphragm ring means coaxial with said first-mentioned ring means and also cooperating with the diaphragm of the camera to set the diaphragm; manually operable means operatively connected to said second ring means for manually turning the latter to set the diaphragm; and manually operable exposure time setting means for setting the exposure time independently of said exposure time control means.

3. In a camera, in combination, rotary diaphragm ring means turnable about the optical axis of the camera for setting the diaphragm thereof, said ring means having a free camming edge portion for controlling the exposure time; automatic means cooperating with said ring means for turning the latter according to the lighting conditions; manually turnable ring means coaxial with said rotary diaphragm ring means and also having a free camming edge portion for controlling the exposure time; and a single cam follower pin engaging both of said camming edge portions, so that turning of either of said ring means will result in movement of said pin, said pin forming part of an exposure time setting mechanism.

4. In a camera, in combination, rotary diaphragm ring means turnable about the optical axis of the camera for setting the diaphragm thereof, said ring means having a free camming edge portion for controlling the exposure time; automatic means cooperating with said ring means for turning the latter according to the lighting conditions; manually turnable ring means coaxial with said rotary diaphragm ring means and also having a free camming edge portion for controlling the exposure time; and a single cam follower pin engaging both of said camming edge portions, so that turning of either of said ring means will result in movement of said pin, said pin forming part of an exposure time setting mechanism; and manually turnable diaphragm ring means for setting the diaphragm independently of said rotary diaphragm ring means, said manually turnable diaphragm ring means being coaxial with said rotary diaphragm ring means.

5. In a camera, in combination, rotary diaphragm ring means turnable about the optical axis for setting the diaphragm of the camera; automatic means movable from a rest position and operatively connected to said ring means for automatically turning the latter to set the diaphragm according to lighting condition; manually operable release means releasably holding said automatic means in said rest position thereof, said automatic means when released having a portion which moves along a predetermined path; manually operable means cooperating with said diaphragm ring means for actuating the latter to manually set the diaphragm; and a stop pin carried by said manually operable means for movement therewith and located in said path of movement of said portion of said automatic means at all except one position of said manually operable means so that said automatic means will be prevented from operating except when said manually operable means is in said one position.

6. In a camera, in combination, exposure time setting means; automatic means movable from a predetermined rest position and cooperating with said exposure time setting means for actuating the latter to set the exposure time according to the lighting positions, said automatic means having a portion which moves along the predetermined path during movement of said automatic means from said rest position thereof; manually operable release means cooperating with said automatic means for yieldably maintaining same in said rest position thereof; manually operable exposure time settting means; and a stop member carried by said manually operable exposure time setting means and located in said path of movement of said portion of said automatic means at all except one position of said manually operable exposure time setting means, so that when the latter is in said one position the exposure time may be automattically set while in all other positions of said manually operable exposure time setting means the automatic setting of the exposure time is prevented.

7. In a camera, in combination, a manually turnable member turnable about the optical axis and forming part of a structure for determining the exposure of a film in the camera; a lever turnable about an axis parallel to but spaced from the optical axis and forming part of a structure for automatically determining the exposure, said lever having a rest position and said lever having an arm which in said rest position of said lever extends along an arc of a circle whose center is in the optical axis; and a stop member carried by said manually turnable member for turning movement therewith and located beside said arm of said lever in all except one position of said manually turnable member, said stop member when said manually turnable member is in a position other than said one position thereof being located in the path of turning movement of said arm of said lever whereby said lever is turnable only when said manually turnable member is in said one position thereof.

8. In a camera as recited in claim 7, said manually turnable member forming part of an exposure time setting structure.

9. In a camera as recited in claim 7, said manually turnable member forming part of a diaphragm setting structure.

10. In a camera, in combination, a pair of coaxial manually turnable members turnable about the optical axis of the camera and adapted to be operated for manually setting the exposure time and the exposure aperture; a pair of stop members respectively fixed to said manually turnable members for turning movement therewith; a lever turnable about an axis parallel to but spaced from the optical axis and turning in a predetermined direction from a rest position during automatic actuation of the camera, said lever forming part of a mechanism for automatically setting the camera and said lever having a pair of arcuate arms respectively extending in said rest position of said lever along circles which are concentric with each other and which have their common center in the optical axis, one of said arms turning toward the optical axis and the other of said arms turning away from the optical axis during turning of said lever in said direction from said rest position thereof, one of said stop members being located between said one arm and the optical axis when said lever is in said rest position thereof in all positions of the manually turnable member which carries said one stop member except one position of the latter manually turnable member, so that in said one position only said lever can turn from said rest position thereof, and the other of said stop members being located at that side of the other of said arms which is distant from the optical axis in all positions of the other of said manually turnable members, which carries said other stop member, except one position thereof so that said lever is free to turn in said direction from said rest position thereof only when said other manually turnable member is also in said one position thereof.

References Cited by the Examiner
UNITED STATES PATENTS

| 2,911,897 | 11/59 | Fahl | 95—64 |
| 2,926,571 | 3/60 | Sommer | 95—64 X |
| 2,969,004 | 1/61 | Gebele | 95—10 |

References Cited by the Applicant
UNITED STATES PATENTS

| 2,868,095 | 1/59 | Gebele. |

NORTON ANSHER, *Primary Examiner.*

D. B. LOWE, EMIL G. ANDERSON, *Examiner.*